United States Patent [19]

Niswonger

[11] Patent Number: 4,494,431
[45] Date of Patent: Jan. 22, 1985

[54] PORTABLE RADIAL ARM SAW

[76] Inventor: John O. Niswonger, 1947 Silver Spur Cir., Ojai, Calif. 93023

[21] Appl. No.: 375,874

[22] Filed: May 7, 1982

[51] Int. Cl.³ .............................................. B27B 5/00
[52] U.S. Cl. .................................. 83/471.3; 83/486.1; 83/574
[58] Field of Search .............. 83/471, 471.2, 471.3, 83/481, 486, 486.1, 527, 522, 574; 144/35

[56] References Cited

U.S. PATENT DOCUMENTS

| | | | |
|---|---|---|---|
| 2,326,416 | 8/1943 | Tracy | 143/6 |
| 2,489,420 | 11/1949 | Kirk et al. | 143/6 |
| 2,568,957 | 9/1951 | Hess | 83/471.3 |
| 2,627,880 | 2/1953 | Johnson | 143/6 |
| 2,630,147 | 3/1953 | Garberg | 83/471.3 |
| 2,677,399 | 5/1954 | Getsinger | 83/471.3 |
| 2,987,083 | 6/1961 | Ross et al. | 143/6 |
| 3,092,154 | 6/1963 | Dobslaw | 83/574 |
| 3,123,108 | 3/1964 | Gaskell et al. | 83/471.3 |
| 3,225,799 | 12/1965 | Hayden | 83/574 |
| 3,295,568 | 1/1967 | Cassey | 143/6 |
| 3,450,176 | 6/1969 | Pollak et al. | 143/6 |
| 3,483,901 | 12/1969 | Ray | 83/471.3 |
| 3,565,134 | 2/1971 | Toms | 83/471.2 |
| 3,565,136 | 2/1971 | Rosenthal, Jr. | 143/6 |
| 3,586,079 | 6/1971 | Collins, Sr. et al. | 144/35 |
| 3,945,286 | 5/1976 | Smith | 83/486.1 |
| 4,152,961 | 5/1979 | Batson | 83/471.3 |
| 4,181,057 | 1/1980 | Bassett | 83/471.3 |
| 4,328,728 | 5/1982 | Ferdinand et al. | 83/574 |

Primary Examiner—James M. Meister
Assistant Examiner—John L. Knoble
Attorney, Agent, or Firm—Fulwider, Patton, Rieber, Lee & Utecht

[57] ABSTRACT

A portable radial arm saw having a base for attachment to a work table, a post mounted to the base and carrying horizontally oriented rails for adjustable vertical movement. The rails support a carriage from which is suspended a circular saw. Interconnections between the carriage and the circular saw enable movement of the saw about both horizontal and vertical axes. Such interconnections include a bracket extending across the circular saw motor for attachment to forward structure of the circular saw base plate, a rearward portion of the bracket extending downwardly and rearwardly between the handle and safety guard of the saw for attachment to rearward structure of the saw base plate. Various embodiments of the bracket adapt the bracket for attachment to many types of portable circular saws.

8 Claims, 9 Drawing Figures

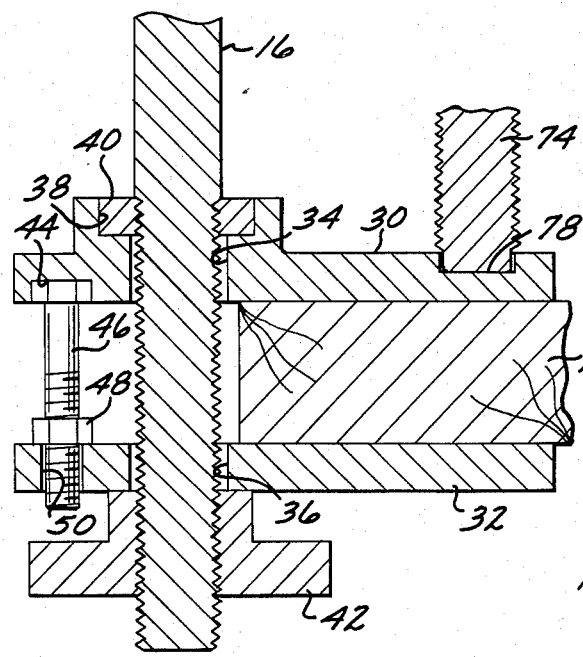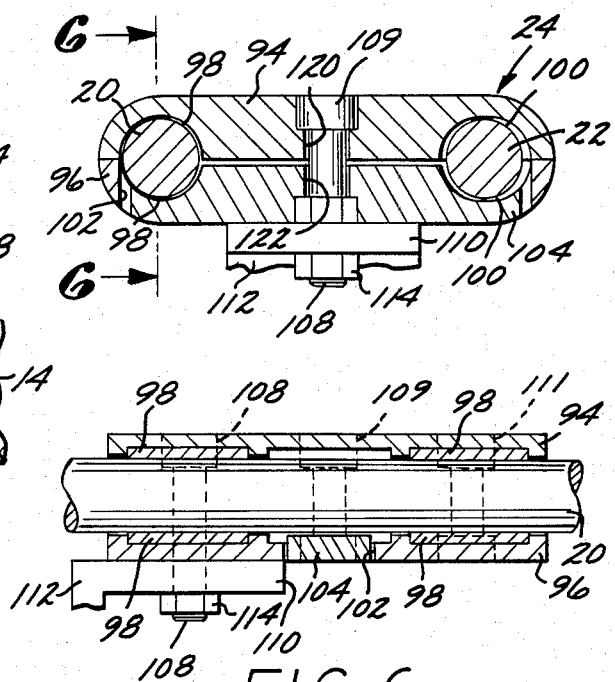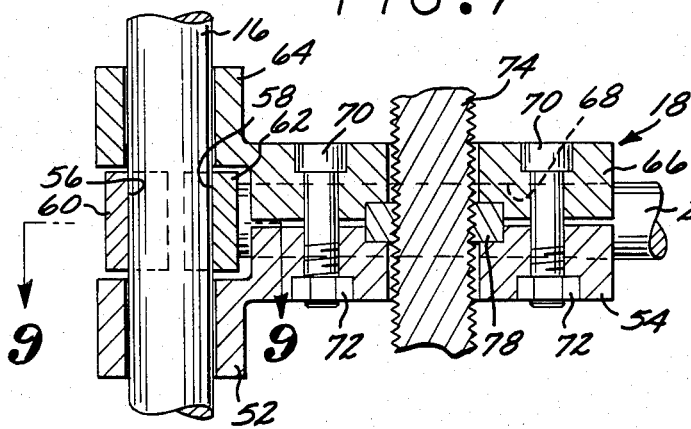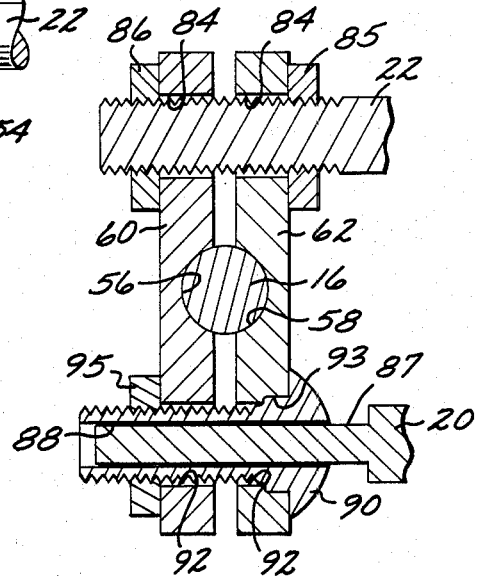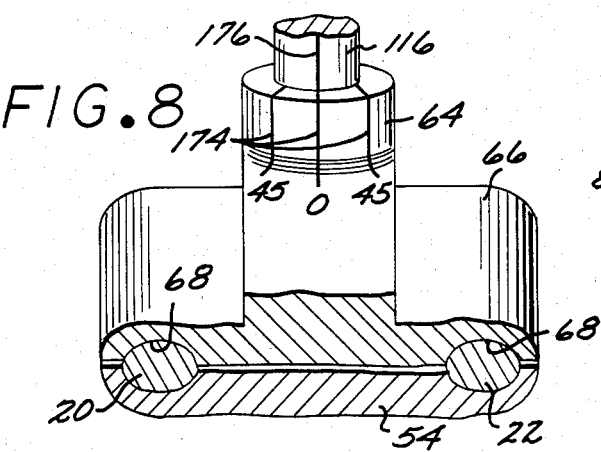

PORTABLE RADIAL ARM SAW

BACKGROUND OF THE INVENTION

1. Field of the Invention

The present invention relates to portable radial arm saws which include a detachably mounted, separably useful circular saw.

2. Description of the Prior Art

A variety of excellent radial arm saws are available for precision cutting operations. Such radial arm saws typically include integral tables, vertical posts of relatively massive construction, and an integral saw carried by a relatively complex carriage mechanism slideable along a heavily constructed horizontal rail or rails. Such radial arm saws are relatively complex and too expensive to be within the reach of most hobbyists and do-it-yourselfers. Such a saw is not conveniently movable from one location to another because of the inherent weight associated with the heavy structure of the saw. To use such a saw on-site a contractor, for example, would need a truck to carry it to the job.

Various systems and kits have been advanced in the prior art for utilizing a conventional power circular saw together with other structure to perform the function of a stationary radial arm saw. Such devices tend to be relatively complex and incapable of firmly and reliably holding the circular saw so as to achieve precision cuts in a work piece. An even greater failing of such prior art systems is their lack of universality of attachment to the various brands of circular saw on the market. Although a typical circular saw is characterized by a saw guard, a handle spaced inwardly of the saw guard and overlying a motor housing, the base plate of the saw through which the blade extends differs from one manufacturer to another.

Desirably, a portable radial arm saw should be adapted to fit or cooperate with most if not all of the available circular saws. Unfortunately, most of the prior art portable radial arm saws are not adapted to be associated with more than a limited number of circular saw types. In addition, the mounting brackets or other attachments which support the circular saw interfere with convenient operation of the circular saw. In some instances the brackets prevent easy access to the saw handle, and in others the means for rotating the saw about vertical and horizontal axes is complex and involves the use of relatively heavy fittings. For example, the devices of U.S. Pat. Nos. 2,987,083 and 3,945,286 both employ a cage-like structure into which the circular saw must be inserted, and which includes a base plate to which the base plate of the saw must be attached. Such a surrounding cage interferes with the easy manipulation of the circular saw to which the user of such a saw is accustomed.

SUMMARY OF THE INVENTION

According to the present invention, a base is provided which allows the radial arm saw to be quickly attached to any supporting surface. The base mounts a vertical post which carries a rail support vertically adjustably movable relative to the post. The rail support carries a pair of horizontally extending cantilever rails which slideably carry a carriage from which a portable circular saw may be suspended. Saw support means attached to the carriage provide for pivotable movement of the circular saw about both vertical and horizontal axes.

The saw support means preferably includes a forward portion extending downwardly for attachment to forward structure of the circular saw base plate, and also includes a rearward portion which extends between the saw handle and safety guard for attachment to rearward structure of the saw base plate.

The rail support is adjustably vertically movable along the post by means which include a vertical screw element engaged at its lower end upon the base and threadedly coupled at its upper extremity to the rail support. The screw element is spaced a predetermined auxiliary column distance inwardly of the post, that is, nearer the carriage than the post. The rail support can be fixed to the post in any adjusted vertical position. Once this is done, operation of the screw element to tend to urge the now relatively immovable carriage upwardly will have the effect of exerting a powerful force against the rails to move them upwardly against any tendency of the rails to sag under the weight of the circular saw. This force is a function of the magnitude of the auxiliary column distance, and provides a surprisingly great structural rigidity which greatly diminishes any vibration or unsteadiness in the circular saw mounting. The screw element is in effect an auxiliary "prop" which strengthens the otherwise purely cantilever mounting of the rails to the post.

With the foregoing arrangement, relatively lightweight components can be quickly interconnected to relatively rigidly and securely support a circular saw for usual ripping and crosscutting. The saw support system supports the circular saw without the use of any surrounding cage-like structure. Instead, one portion of the saw support means extends between the saw handle and safety guard in a recessed position which enables normal grasping of the saw handle for manipulation of the saw. Also, the saw support means includes relatively movable components which easily adapt the saw support means for mounting any of a variety of types of circular saws.

The present radial arm saw may be quickly disassembled for easy transportation to different work sites, or it can be transported as an assembled unit. The circular saw is quickly detachable from the remainder of the radial arm saw for conventional use as a portable power operated hand saw.

Other objects and features of the invention will become apparent from consideration of the following description taken in connection with the accompanying drawings.

BRIEF DESCRIPTION OF THE DRAWINGS

FIG. 4 is an enlarged view taken along the line 4—4 of FIG. 1;

FIG. 5 is an enlarged view taken along the line 5—5 of FIG. 1;

FIG. 6 is a longitudinal cross-sectional view of the components illustrated in FIG. 5;

FIG. 7 is an enlarged view taken along the line 7—7 of FIG. 1;

FIG. 8 is a partial perspective view of a portion of the rail support, illustrating indicia denoting the circumferential position of the support rails relative to the post; and FIG. 9 is an enlarged view taken along the line 9—9 of FIG. 1.

DESCRIPTION OF THE PREFERRED EMBODIMENTS

Figure 1:
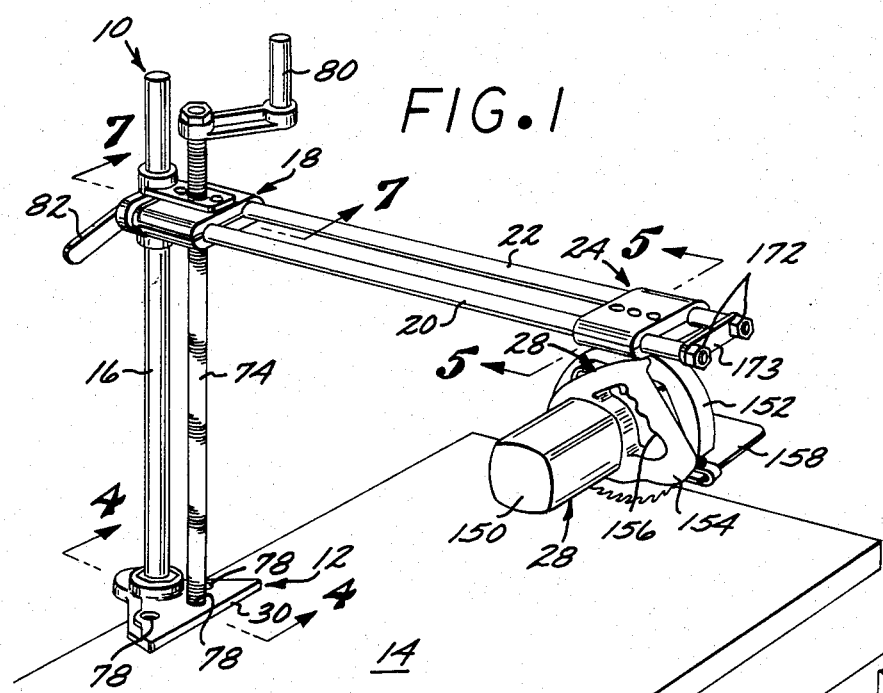
FIG. 1 is a perspective view of a radial arm saw according to the present invention, as it would appear mounted to a work table.

Referring now to the drawings and particularly to FIG. 1, there is illustrated a portable radial arm saw 10 according to the present invention and comprising, generally, a base 12 for attachment to a work supporting surface such as a table 14; a vertically oriented column means or post 16 having a lower extremity coupled to the base 12; rail support means 18 coupled to the post 16 and including a pair of horizontally extending cantilever rails 20 and 22; a carriage 24 coupled to the rails 22 for adjustable horizontal movement along the rails 20 and 22; saw support means 26 carried by the carriage 24 and supporting a usual and conventional portable circular saw 28.

As best seen in FIGS. 1 and 4, the base 12 by which the radial arm saw 10 is securely supported upon the table 14 comprises generally triangularly shaped upper and lower base plates 30 and 32, disposed on the upper and lower sides of the table 14, the apices of the plates 30 and 32 being disposed laterally outwardly of the outer edge of the table 14, and including vertically disposed and aligned bores 34 and 36 through which freely extend a threaded lower extremity of the post 16.

The upper base plate 30 includes a hexagonal sided nut recess 38 for receiving a hexagonal nut 40 through which the post 16 is threaded. In addition, a hexagonal nut 42 is threaded onto the lower end of the post 16 and bears up against the undersurface of the lower base plate 32 to rigidly secure the post 16 in position relative to the plates 30 and 32.

The underside of the apex portion of the upper base plate 30 includes a smaller hexagonal walled nut recess 44 which receives the hexagonal head of a machine bolt 46. A nut 48 is threaded onto the threaded shank of the bolt 46 for engagement with the adjacent upper surface of the lower base plate 32, and the lower extremity of the bolt 46 freely extends through an opening 50 provided in the lower base plate 32 in vertical alignment with the nut recess 44. With this arrangement Rotation of the nut 48 in a downward direction, as viewed in FIG. 4, will tend to move the apex portions of the plates 30 and 32 apart, which has the effect of causing the opposite extremities of the plates 30 and 32 to move inwardly upon the opposite surfaces of the table 14, and thereby more firmly clamp the radial arm saw 10 to the table 14.

The unthreaded upper extremity of the post 16 extends upwardly through a depending circular boss 52 of a lower rail support 54, through the central opening defined by confronting arcuate openings 56 and 58 of outer and inner clamping plates 60 and 62, respectively, and then through an upwardly extending circular boss 64 of an upper rail support 66 which overlies the lower rail support 54.

The inner extremities of the rails 20 and 22 extend through elongated, parallel and horizontally oriented openings 68, as seen in FIGS. 7 and 8. The elongated parallel openings 68 are defined by opposed arcuate recesses formed in the rail supports 64 and 66. The openings 68 are dimensioned such that the supports 54 and 66 are tightly clamped upon the rails 20 and 22 when they are urged toward one another. Such urging is accomplished by means of a pair of Allen head bolts 70 extending through suitable openings in the supports 54 and 66, into threaded engagement with nuts 72.

Although the rail support means 18 thus rigidly and immovably connects the supports 54 and 66 to the inner extremities of the rails 20 and 22, the rail support means 18 is easily slideably movable vertically upon the post 16 by reason of clearances provided between the post 16 and the bosses 52 and 64.

Threaded adjustable movement of the rail support means 18 relative to the post 16 is afforded by operation of an elongated, vertically oriented and threaded screw element 74 which freely passes through suitable openings in the supports 54 and 66. The screw element 74 also passes through a threaded nut 76 captured in opposed recesses provided in confronting portions of the supports 54 and 66.

As seen in FIG. 1, the lower extremity of the screw element 74 normally rotatably rests within the middle recess 78 of three recesses 78 provided in the upper base plate 30. The middle recess 78 constitutes a "zero" angle recess, while the other recesses are arranged at 45 degrees on either side of the middle recess 78.

The upper extremity of the screw element 74 mounts a crank arm 80 for rotating the screw element 74 in opposite directions to raise and lower the rail support means 18 upon the post 16. Pulling upwardly upon the rails 20 and 22 will slide the bosses 64 and 52 upon the post 16, and unseat the lower extremity of the screw element 74 from the middle recess 78. The rails can then be swung to one side or the other to seat the lower extremity of the screw element 74 in the selected side recess 78, whereupon the saw 28 will be operative to crosscut a work piece at a 45 degree angle, as will be apparent.

The vertically adjusted position of the rail support means 18, and the rails 20 and 22, which is achieved by rotation of the screw element 74, is maintained by operation of a wrench 82.

More particularly, as best seen in FIG. 9, the inner extremity of the rail 22 is threaded and successively passes through a nut 85 bearing against the inner face of the inner clamping plate 62, through a pair of horizontally aligned openings 84 provided in the plates 62 and 60, and through a nut 86 which bears against the outer face of the outer clamping plate 60.

In contrast, the rail 20 is provided with a reduced diameter portion 87 which passes through a horizontal bore 88 provided in a threaded carriage bolt 90. The bolt 90 extends through horizontally aligned openings 92 provided in the clamping plates 62 and 60. The head of the bolt 90 bears against the inner face of the inner clamping plate 62. The square portion of the bolt 90 immediately underlying the head is received within a square recess 90 constituting an enlargement of the opening 92. A nut 95 is threaded onto the shank of the bolt 90 and bears against the outer face of the outer clamping plate 60.

Tightening the nuts 86 and 95 will urge the clamping plates 60 and 62 toward one another to firmly engage and clamp upon the post 16 and thereby prevent any vertical movement of the rail support means 18.

It is particularly noted that tightening of the nut 86 tends to induce a small but significant axial or longitudinal movement of the associated rail 22. If the tightening arrangements were the same for both rails 20 and 22, tightening of the nuts 86 and 95 would have to be precisely the same to avoid any differential longitudinal movement of the rails 20 and 22. Otherwise, the rails 20 and 22 would become misaligned and their desired parallel relation would be destroyed and prevent easy slidable movement of the carriage 24. However, slidable receipt of the reduced diameter portion 87 of the rail 20 within the bore 88 of the bolt 90 allows compensatory longitudinal movement of the rail 20 to maintain the desired parallel relation with the rail 22.

Referring now to FIGS. 1-3, 5 and 6, the carriage 24 comprises upper and lower carrier plates 94 and 96 which include elongated, parallel and horizontally oriented openings of arcuate cross section. The opposite extremities of these openings are enlarged to receive pairs of opposed semicylindrical bearings 98 and 100, respectively for slidably engaging the rails 20 and 22. The opening within which the bearings 100 is received is laterally elongated or enlarged to compensate for any slight deviation of the rails 20 and 22 from a perfectly parallel relationship. Thus, the bearings 100 are permitted slight lateral movement to compensate for irregularities in the rails 20 and 22, and particularly for any discrepancy in the parallel relation of the rails 20 and 22.

The central portion of the lower carrier plate 96 between the bearing recesses includes a lateral cut-out 102 which receives a laterally oriented clamp 104 having arcuate recesses 106 adapted to engage the undersides of the rails 20 and 22.

Figure 2:
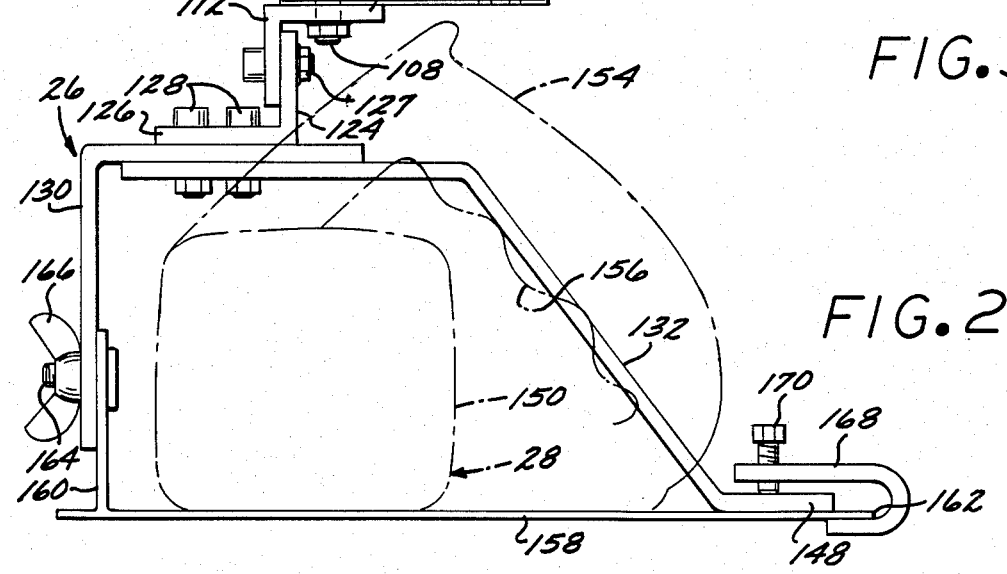
FIG. 2 is a side elevational view of the carriage and the associated saw support means, and also the base plate of the circular saw to which the saw support means is coupled, the motor housing and handle of the circular saw being illustrated in phantom outline.

Allen head fasteners 108, 109 and 111 as seen in FIGS. 1, 5 and 6, extend downwardly through suitable vertically aligned openings located centrally of the bearings 98 and 100, the fastener nuts for the fasteners 109 and 111 being recessed within the lower carrier plate 94. The fastener 108 extends through an opening in the horizontal leg 110 of an L-shape bracket having a depending leg 112 at its forward extremity, as seen in FIG. 2. A nut 114 secures the leg 110 to the fastener 108, as seen in FIG. 6. The fastener nuts 114 are tightened on the fasteners 108 and 111 only enough to firmly hold the carriage 24 upon the rails 20 and 22, but without interfering with the slideable movement of the carriage 24 along the rails 20 and 22.

When it is desired to firmly fix the position of the carriage 24 at some point along the length of the rails 20 and 22, the Allen head fastener 109 is tightened.

Figure 3:
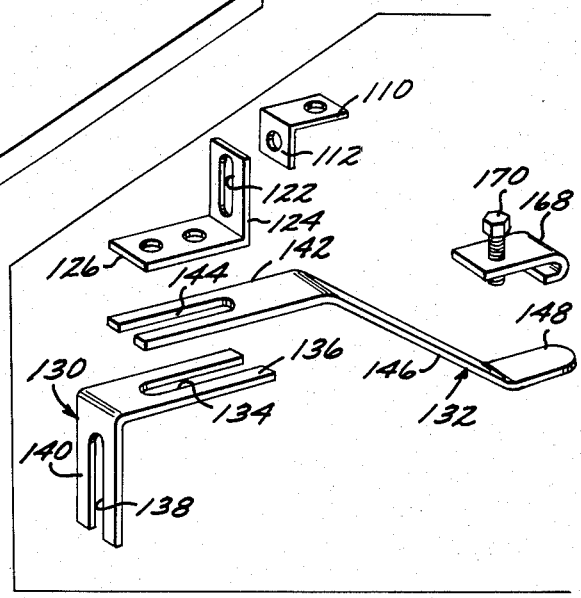
FIG. 3 is an exploded, perspective view of portions of the saw support system of FIG. 2.

As best seen in FIGS. 1-3, the saw support means 26 comprises an L-shape angle or bracket having an upstanding leg 124 attached to the leg 112 of the superjacent bracket by means of a single fastener assembly 127. The assembly 127 extends through a vertical slot 122 to enable vertical adjustability of the height of the circular saw 28.

The horizontal leg 126 of the angle is attached by a pair of fasteners 128 to a pair of saw brackets 130 and 132. The bracket 130 is right angular in configuration and includes an elongated end slot 134 in its horizontal leg 136 and an elongated end slot 138 in its vertical leg 140.

The bracket 132 is characterized by a horizontal leg 142 having an elongated end slot 144, and a downwardly and rearwardly extending diagonal leg 146 which terminates in a horizontally extending tab portion or leg 148. The fastener 128 extends through the end slots 144 and 134 to connect the brackets 130 and 132 and the leg 126 together.

The conventional portable circular saw 28 employed in the present radial saw 10 typically comprises a motor housing 150, a fixed blade or safety guard 152 and a handle 154 which is spaced inwardly of the guard 152 to enable the user to move his hand between the handle and the guard for insertion into the handle opening 156.

The circular saw 28 also comprises a rectangular base plate 158 through which the saw blade extends. The plate 58 is characterized by a forward edge having an upstanding vertical flange 160 and a rearward edge 162. The size of the motor housing, the handle, the guard and the base plate will vary with the capacity and brand of the particular circular saw, and the arrangement described is therefore merely exemplary.

The flange 160 usually includes a slot or opening for mounting accessories, or to provide for lateral tipping of the base plate 158. This slot or opening is utilized for attaching the bracket 130 to the base plate 158. Thus, a headed fastener 164 is disposed through opening in the flange 160, and through the elongated slot 138 of the bracket 130. A wing nut 166 is threaded onto the fastener to firmly secure the bracket 130 to the flange 160. This is only one means which can be used to secure the bracket 130 to or adjacent to the forward extremity of the base plate 158. Some types of circular saws include openings in other portions of the base plate, or have upstanding clips or the like (not shown). If so, it is contemplated that suitable fasteners will be employed to attach the bracket 130 thereto, as will be apparent.

At the opposite end of the base plate 158, the leg 148 of the bracket 132 is firmly pressed down upon the rearward extremity of the base plate 158 adjacent the edge 162, and the underside of a U-shape fitting 168 engages the underside of the base plate 158. The upper side of the U-shape fitting 168 threadably mounting a fastener 170 is tightened to spread the opposite sides of the U-shape fitting 168 and thereby firmly clamp the bracket leg 148 on to the base plate 158. This type of attachment could also be used to attach the bracket 130 to the base plate 158, if desired. The present invention is not limited to any particular means for attaching the brackets 130 and 132 to the base plate 158, although the means illustrated is preferred.

Use of the brackets 130 and 132 provides a convenient means for attaching the circular saw 28 to the superjacent bracket structure since the slots 138, 134 and 144 permit adjustment for different heights and lengths of motor housings. It is particularly noted that the configuration and width of the brackets 130 and 132 enables their location between the handle 154 and the saw guard 152 where they do not interfere with the user's ability to insert his fingers within the handle opening 156.

If desired, the brackets 130 and 132 could be made integral as a single bracket. There would then be no capacity for adjustment to different types of circular saws, but the arrangement would be suitable for use with a particular brand and size of circular saw. Even the single bracket arrangement would provide easy access to the saw handle and would eliminate any need for a surrounding, obstructive mounting cage or the like. Another possible arrangement of the brackets 130 and 132 is to connect their lower extremities to the opposite extremities of an elongated strap (not shown) underlying the base plate 158. However, the universal arrangement disclosed is believed to be more convenient in most applications.

In operation, the components of the saw 10 are assembled, and the base plates 30 and 32 firmly clamped to the table 14 by tightening of the nut 42. The handle 80 is operated to adjust the desired height of the saw blade, and the wrench 82 is then turned to fix the rail support means 18 in the vertically adjusted position. Next, the screw element 74 is operated to tend to raise the rail support means 18, which "preloads" the system against downward deflection of the free extremities of the rails 20 and 22.

The fastener 109 is loosened to enable the saw to be moved inwardly and outwardly on the rails 20 and 22 to crosscut a work piece located on the table 14.

The carriage 24 is prevented from sliding off the rails 20 and 22 by a spacer strap 173 disposed over the ends of the rails and held in position by a pair of nuts 172 threaded onto the ends of the rails. If it is desired to make a cut at some angle relative to a vertical plane, the fastener assembly 127 is loosened to permit tilting of the saw about a horizontal axis to the angle desired, after which the assembly 127 is again tightened.

A ripping operation is enabled by loosening the fastener assembly 108, rotating the saw about the vertical axis of the assembly 108 to the desired ripping position, and retightening the assembly 108.

When the saw is to be used to crosscut at an angle, the screw element 74 is raised and relocated in the desired recess 78 after loosening the wrench 82, as previously described, and the angle of cut will then be indicated by the alignment of degree indicia 174 provided on the upper rail support 66 with a vertical line 176 provided on the post 16, as seen in FIG. 8.

From the foregoing it is seen that the saw support means 26 is quickly and easily adapted for supporting different configurations and sizes of circular saws in suspended position beneath the carrier means 24. By simply loosening the wing nut 166 and the fasteners 128 and 170, virtually any circular saw can be quickly and easily mounted in position. This mounting, and the bracing or "prop" action of the screw element 74, provide great stability, such that there is no significant deflection or vibration of the circular saw that would adversely affect precision cutting operations.

Various modifications and changes may be made with regard to the foregoing detailed description without departing from the spirit of the invention or the scope of the following claims.

I claim:
1. A radial arm saw comprising:
a base for attachment to a work support surface;
a vertical post attached to said base;
a rail support coupled to said post for vertical adjustable movement along said post;
horizontally extending rail means supported by said rail support and extending inwardly of said vertical post;
a carriage coupled to said rail means for horizontal movement along said rail means; and
saw support means for suspending beneath said carriage a circular saw of the type having a motor housing, a saw guard, a handle overlying said motor housing and spaced inwardly of said saw guard, and a base plate through which the blade of said circular saw extends, said saw support means being coupled to said carriage for movement of said circular saw about vertical and horizontal axes, said saw support means including a forward portion extending downwardly for attachment to forward structure of said base plate, and further including a rearward portion extending rearwardly and downwardly for overlying engagement upon that portion of said saw located between said handle and said saw guard, said rearward portion being adapted to fit in the space between said handle and said saw guard whereby said handle is accessible for use in manipulating said circular saw, said forward portion of said saw support means comprising a forward bracket adapted to extend forwardly of said motor housing and downwardly for fixed connection to said forward structure of said base plate, said rearward portion of said saw support means comprising a rearward bracket adapted to extend rearwardly of said motor housing and downwardly for fixed connection to said rearward structure of said base plate, said forward bracket being generally vertically slotted at the point of said fixed connection to accommodate saws of different heights, said forward and rearward brackets being interconnected and at least one of said forward and rearward brackets being generally horizontally slotted where they are interconnected thereby to accommodate different sizes of base plates, said saw support means further including a fitting having a lower portion for engaging the underside of said rearward structure of said base plate, and an upper portion adapted to overlie said rearward structure, said upper portion having a threaded element operative to bias said upper portion away from said rearward bracket for urging said rearward bracket and said reward structure together.

2. A radial arm saw comprising:
a base for attachment to a work support surface, said base including upper and lower base plates adapted for location adjacent an edge of a support structure to overlie and underlie opposite sides of said support structure, respectively, said base plates including base plate portions extending outwardly of said edge of said support structure;
a vertical post attached to said base, said post including a threaded lower extremity;
a rail support coupled to said post for vertical adjustable movement along said post;
first fastener means threadedly coupled to said threaded lower extremity of said post and operative to urge said upper and lower base plates together; and
second fastener means disposed between said base plate portions and operative to urge said base plate portions apart thereby forcibly to urge said base plates against said opposed sides of said support structure.

3. A radial arm saw comprising:
a base for attachment to a work support surface;
a vertical post attached to said base;
a rail support coupled to said post for vertical adjustable movement along said post, said rail support including a threaded portion;
horizontally extending rail means supported by said rail support and extending inwardly of said vertical post;
a carriage coupled to said rail means for horizontal movement along said rail means;

saw support means for suspending beneath said carriage a circular saw of the type having a motor housing, a saw guard, a handle overlying said motor housing and spaced inwardly of said saw guard, and a base plate through which the blade of said circular saw extends, said saw support means being coupled to said carriage for movement of said circular saw about vertical and horizontal axes;

a vertically oriented screw spaced inwardly of said vertical post and engaging said base inwardly of said post, said screw being threadedly engaged with said threaded portion whereby rotation of said screw alters the vertical position of said rail support relative to said post;

a pair of confronting clamp elements on opposite sides of said post; and fastener means coupled to said clamp elements and operative to urge said clamp elements together against said post to adjustably fix the vertical position of said rail support whereby rotation of said screw is adapted to urge said rail support upwardly relative to said base thereby to resist sagging of said rail means under the weight of said carriage, said saw support means and said saw.

4. A radial arm saw according to claim 3 wherein said carriage comprises upper and lower carriage plates overlying and underlying said rail means; wherein said rail means comprises a pair of parallel, spaced apart rails of circular cross section; and wherein said carriage plates define a pair of elongated openings for slidably receiving said rails, one of said openings being laterally enlarged to accommodate misalignment of said rails and thereby prevent binding between said rails and said upper and lower carriage plates.

5. A radial arm saw according to claim 4 wherein said carriage includes clamping means operative to engage said rails and constrain said carriage against movement relative to said rails.

6. A radial arm saw for detachably supporting a portable circular saw for ripping and crosscutting operations, said circular saw being characterized by a motor housing, a saw guard, a handle overlying said motor housing and spaced inwardly of said saw guard, and a base plate through which the blade of said circular saw extends, said radial arm saw comprising:

saw support means including a forward portion extending downwardly for location adjacent forward structure of said base plate, and further including a rearward portion extending rearwardly and downwardly for overlying engagement upon that portion of said saw located between said handle and said saw guard for location adjacent rearward structure of said base plate, said rearward portion being adapted to fit in the space between said handle and said saw guard whereby said handle is accessible for use in manipulating said circular saw; said forward portion of said saw support means comprising a forward bracket adapted to extend forwardly of said motor housing and downwardly for fixed connection to said forward structure of said base plate, said rearward portion of said saw support means comprising a rearward bracket adapted to extend rearwardly of said motor housing and downwardly for fixed connection to said rearward structure of said base plate, said forward bracket being generally vertically slotted at the point of said fixed connection to accommodate saws of different heights, said forward and rearward brackets being interconnected and at least one of said forward and rearward brackets being generally horizontally slotted where they are interconnected thereby to accommodate different sizes of base plates, said saw support means further including a fitting having a lower portion for engaging the underside of said rearward structure of said base plate, and an upper portion adapted to overlie said rearward structure, said upper portion having a threaded element operative to bias said upper portion away from said rearward bracket for urging said rearward bracket and said rearward structure together.

7. A radial arm saw comprising:

a base for attachment to a work support surface;

a vertical post attached to said base;

a rail support coupled to said post for vertical adjustable movement along said post, said rail support extending from one side of said post;

horizontally extending rail means supported by said rail support;

a carriage coupled to said rail means for movement along said rail means;

saw support means for suspending a circular saw beneath said carriage;

clamping means operative to fix said rail support relative to said post in any vertically adjusted position of said rail support; and a vertically oriented element having a lower end engaged upon said base on said one side of said post in axially spaced relation to said post, coupled at its upper extremity to said rail support, and operative to raise and lower said rail support relative to said post, said element being further operative, upon operation of said clamping means to fix said rail support relative to said post, to urge said rail support upwardly, and thereby structurally rigidify the support of said rail means by said rail support and the coupling of said rail support to said post.

8. A radial arm saw according to claim 7 wherein said element is a screw element threadedly coupled to said rail support.

* * * * *